(12) United States Patent
Klein et al.

(10) Patent No.: US 7,563,744 B2
(45) Date of Patent: Jul. 21, 2009

(54) CATALYST FEATURING SILICONE DIOXIDE BASED SUPPORT MATERIAL FOR THE PURIFICATION OF EXHAUST GASES

(75) Inventors: Harald Klein, Bessenbach (DE); Ulrich Neuhausen, Kahl am Main (DE); Egbert Lox, Hochwaldhauser (DE); Jürgen Gieshoff, Biebergemünd (DE); Thomas Kreuzer, Karben (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 788 days.

(21) Appl. No.: 10/486,148

(22) PCT Filed: Aug. 8, 2002

(86) PCT No.: PCT/EP02/08890

§ 371 (c)(1),
(2), (4) Date: Jul. 9, 2004

(87) PCT Pub. No.: WO03/024589

PCT Pub. Date: Mar. 27, 2003

(65) Prior Publication Data
US 2006/0183636 A1    Aug. 17, 2006

(30) Foreign Application Priority Data
Aug. 9, 2001    (EP) ................................. 01119213

(51) Int. Cl.
*B01J 23/00* (2006.01)
*B01J 21/00* (2006.01)
*B01J 29/00* (2006.01)
*B01J 20/00* (2006.01)

(52) U.S. Cl. ........................... 502/326; 502/66; 502/71; 502/73; 502/74; 502/77; 502/78; 502/79; 502/87; 502/242; 502/252; 502/261; 502/262; 502/263; 502/302; 502/303; 502/327; 502/328; 502/333; 502/334; 502/339; 502/340; 502/341; 502/349; 502/355; 502/407; 502/414; 502/415; 502/439; 502/527.12; 502/527.19

(58) Field of Classification Search ................... 502/66, 502/71, 73, 74, 77, 78, 79, 87, 242, 252, 502/261, 262, 263, 302, 303, 326, 327, 328, 502/333, 334, 339, 340, 341, 349, 355, 407, 502/414, 415, 439, 527.12, 527.19
See application file for complete search history.

(56) References Cited

U.S. PATENT DOCUMENTS 3,472,617 A * 10/1969 Maher et al. ................. 423/712
4,049,781 A *  9/1977 Acker et al. ................. 423/338

(Continued)

FOREIGN PATENT DOCUMENTS

EP    0377975 A1    7/1990
EP    0807615 A1   11/1997

(Continued)

OTHER PUBLICATIONS

International Search Report (PCT EP02/08890).

*Primary Examiner*—Cam N. Nguyen
(74) *Attorney, Agent, or Firm*—Kalow & Springut LLP; William D. Schmidt

(57) ABSTRACT

The present invention relates to a catalyst for the purification of exhaust gases from an internal combustion engine, which comprises a catalytically active coating on an inert ceramic or metal honeycomb body, said coating comprising at least one platinum group metal selected from the group consisting of platinum, palladium, rhodium and iridium on a fine, oxidic support material. As an oxidic support material, the catalyst comprises a low-porosity material on the basis of silicon dioxide that comprises aggregates of essentially spherical primary particles having an average particle diameter of between 7 and 60 nm.

28 Claims, 1 Drawing Sheet

U.S. PATENT DOCUMENTS

Figure 1:
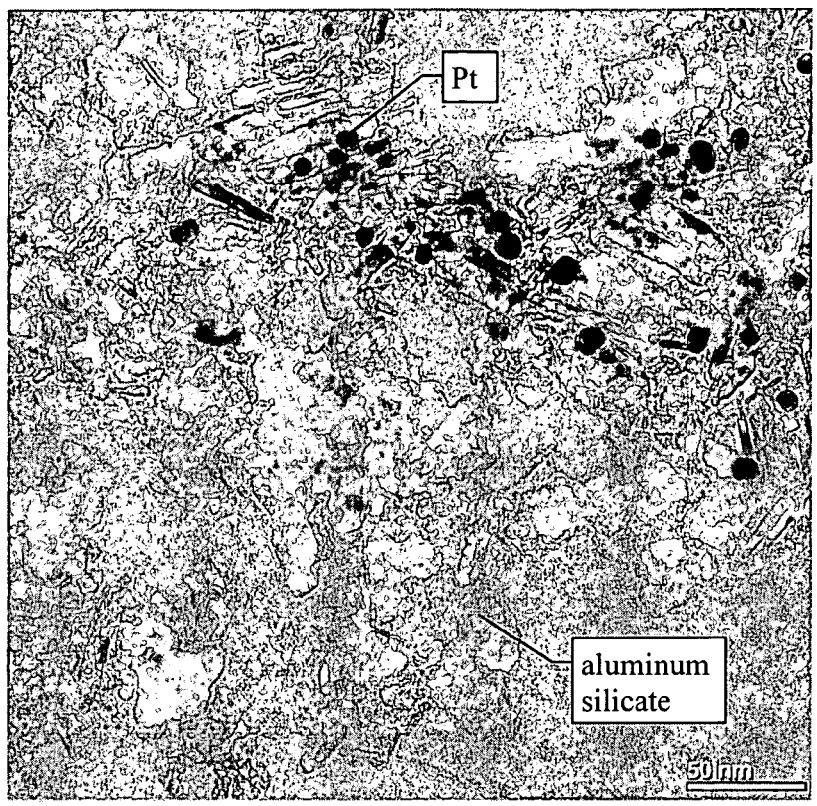

| | | | |
|---|---|---|---|
| 4,279,752 A * | 7/1981 | Sueoka et al. | 210/500.22 |
| 5,002,918 A | 3/1991 | Deller et al. | |
| 5,128,114 A * | 7/1992 | Schwartz | 423/335 |
| 5,175,136 A * | 12/1992 | Felthouse | 502/242 |
| 5,591,414 A * | 1/1997 | Jacob et al. | 422/180 |
| 5,830,421 A * | 11/1998 | Gardner et al. | 423/213.2 |
| 5,882,607 A * | 3/1999 | Miyadera et al. | 422/177 |
| 5,919,425 A * | 7/1999 | Nguyen et al. | 423/210 |
| 5,928,981 A * | 7/1999 | Leyrer et al. | 502/64 |
| 5,976,480 A | 11/1999 | Mangold et al. | |
| 6,066,691 A * | 5/2000 | Sobottka et al. | 524/450 |
| 6,077,489 A * | 6/2000 | Klein et al. | 423/213.5 |
| 6,103,004 A * | 8/2000 | Belligoi et al. | 106/482 |
| 6,342,465 B1 * | 1/2002 | Klein et al. | 502/339 |
| 6,380,265 B1 * | 4/2002 | Pryor et al. | 516/85 |
| 6,623,820 B1 * | 9/2003 | Nakahara et al. | 428/32.37 |
| 6,645,439 B2 * | 11/2003 | Zhang et al. | 422/177 |
| 6,677,264 B1 * | 1/2004 | Klein et al. | 502/74 |
| 6,685,900 B2 * | 2/2004 | Domesle et al. | 423/213.5 |
| 6,869,573 B2 * | 3/2005 | Abe et al. | 422/180 |

FOREIGN PATENT DOCUMENTS

| | | |
|---|---|---|
| EP | 0916402 A1 | 5/1999 |
| JP | 02194818 A | 8/1990 |
| JP | 06031174 | 2/1994 |
| JP | 08243397 | 9/1996 |
| JP | 10081508 | 3/1998 |

* cited by examiner

CATALYST FEATURING SILICONE DIOXIDE BASED SUPPORT MATERIAL FOR THE PURIFICATION OF EXHAUST GASES

The present invention relates to a catalyst (catalytic converter) for the purification of exhaust gases from an internal combustion engine, which comprises a catalytically active coating on an inert ceramic or metal honeycomb body, said coating comprising at least one of the platinum group metals platinum, palladium, rhodium and iridium on a fine, oxidic support material. The catalyst is especially suitable for the oxidative purification of exhaust gases from diesel engines since it exhibits a good resistance to poisoning by the sulfur components in diesel fuel.

Diesel engines are operated with so-called lean air/fuel mixtures, which means that the air/fuel mixture fed to the engine contains more oxygen than is needed for the complete combustion of the fuel. In addition to unburned hydrocarbons (HC) and carbon monoxide (CO), the exhaust gases from diesel engines also contain nitrogen oxides ($NO_x$) and soot particles. Another pollutant contained in the exhaust gas is sulfur dioxide, which stems from the sulfur contained in diesel fuel.

For purifying the exhaust gases from diesel engines, use is often made of so-called diesel oxidation catalysts, which convert the hydrocarbons and the carbon monoxide in the exhaust gas into harmless components. Furthermore, these catalysts reduce the mass of the particles by oxidizing the organic compounds adsorbed on the particles.

Typical catalysts of this kind comprise a coating of one or more support oxides (for example aluminum oxide, silicon dioxide, titanium dioxide, cerium oxide as well as mixtures thereof, one or more zeolites as well as platinum as a catalytically active component on a ceramic or metal honeycomb body. The employed support oxides or support materials have a large surface area, i.e. their specific surface area (BET surface measured according to the German Industrial Standard DIN 66131) is more than 10 $m^2/g$, preferably more than 50 $m^2/g$. The specific surface area should remain stable up to exhaust gas temperatures of about 800° C. In order to achieve a high degree of catalytic activity, the platinum is distributed very finely on the support oxides The majority of the hydrocarbon emissions are emitted during the cold start phase since the catalyst has not yet reached its operating temperature during this phase. In order to reduce hydrocarbon emissions during the cold start phase, zeolites are added to the catalysts. Zeolites are specific aluminosilicates with a defined pore structure. The pore sizes are in the order of magnitude of small organic molecules. At low temperatures, the zeolites store the hydrocarbons, while at higher temperatures, when the catalyst is active, the hydrocarbons are released again (desorbed) and are then converted at the platinum crystallites of the catalyst.

Such a catalyst is for example described in U.S. Pat. No. 5,157,007. On an inert honeycomb carrier, the catalyst comprises a catalytically active coating, which comprises aluminum oxide, titanium oxide, silicon dioxide, zeolites or mixtures thereof as oxidic support materials for the catalytically active platinum group metals. So-called precipitated silica is used as silicon dioxide. Precipitated silica exhibits a large specific surface area. Their pH value in 5% aqueous dispersion is more than 6 (Schriftenreihe Pigmente Nummer 31: "Sytheische Kieselsäuren als Fließhilfsmittel und als Trägersubstanz" [Technical Bulletin Pigments No. 31: "Synthetic silica as free flow agent and support substance"]; company brochure of the company Degussa AG; $6^{th}$ edition, November 1995). A pyrogenic titanium oxide with a specific surface area of 51 $m^2/g$ is used inter alia as titanium oxide.

U.S. Pat. No. 5,928,981 describes a catalyst for purifying the exhaust gases from diesel engines, the catalyst comprising a mixture of several zeolites. As a support material for the catalytically active platinum group metals the catalyst furthermore comprises at least one material selected from the group consisting of aluminum silicate, aluminum oxide and titanium oxide. Pyrogenic titanium oxide obtained via flame hydrolysis and having a specific surface area of 50 $m^2/g$, which is composed of 70 wt.-% of anatase and 30 wt.-% of rutile is said to be suitable as titanium oxide.

In the last few years, there has been considerable progress in the development of economical diesel engines. Due to their improved efficiency, modern diesel engines exhibit very low exhaust gas temperatures, which may be below 150° C. during urban driving conditions. These temperatures create completely new demands on the durability of diesel catalysts. Due to the low exhaust gas temperatures, the purification of the exhaust gases from such diesel engines leads to an increased adsorption of the hydrocarbons, which clog the pores of the catalyst. This entails a reduction in catalytic activity. The catalyst may even break down completely, causing an engine failure due to the high exhaust-gas backpressure.

Alternating modes of operation consisting of longer drives under a low load followed by steep acceleration to maximum load is also critical. These alternating modes of operation can cause thermal damage to the catalyst when long drives under a low load lead to an adsorption of large amounts of hydrocarbons on the catalyst which upon change to maximum load operation are burned quickly. The released reaction heat can lead to temperatures of up to 1000° C. on the catalyst surface and cause thermal damage to the catalyst.

Another problem encountered by catalysts for the purification of exhaust gases from diesel engines is the sulfur content of the diesel fuel, which is emitted from the engine in the form of sulfur dioxide and adsorbed by the catalyst in the form of sulfates that damage the catalyst. In order to reduce damage caused by sulfur components it has been known to use acidic support oxides for the catalytically active precious metals, which only adsorb sulfur to a low degree.

Figure 2:
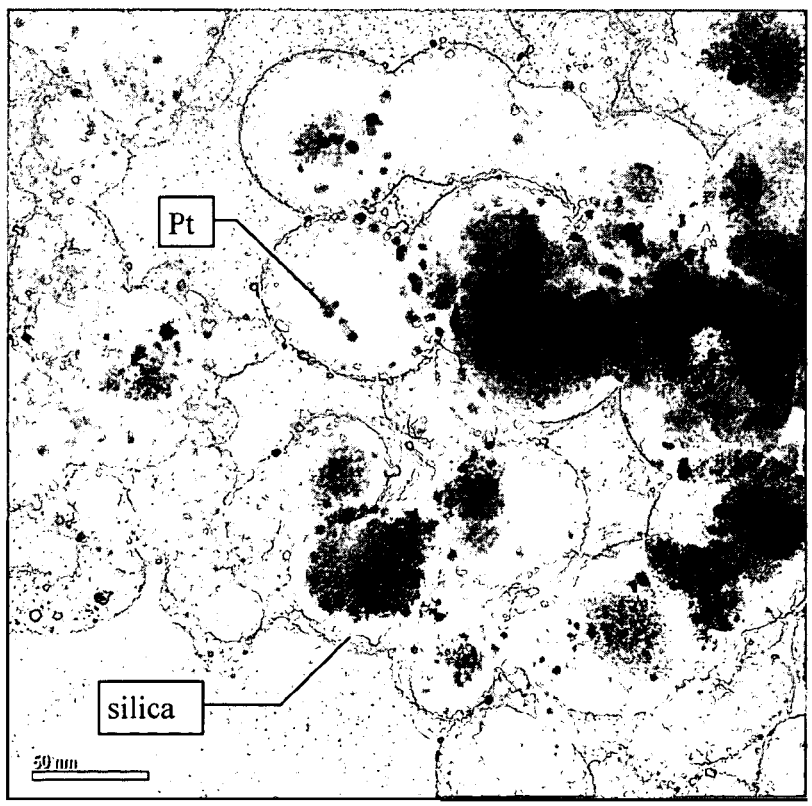

FIGS. 1 and 2 show:

FIG. 1 Photograph of the structure of platinum on aluminum silicate (support material no. 3 of Table 1), taken with a transmission electron microscope.

FIG. 2 Photograph of the structure of platinum on pyrogenic silicon dioxide (support material no. 6 of Table 1), taken with a transmission electron microscope.

There is a demand for diesel oxidation catalysts that exhibit an improved resistance to aging as well as a reduced propensity to be poisoned by sulfur components compared to known catalysts.

The present invention provides a catalyst for the purification of exhaust gases from an internal combustion engine, which comprises a catalytically active coating on an inert ceramic or metal honeycomb body, said coating comprising at least one platinum group metal selected from the group consisting of platinum, palladium, rhodium and iridium on a fine, oxidic support material. The oxidic support material is a low-porosity material on the basis of silicon dioxide and comprises aggregates of essentially spherical primary particles having an average particle diameter of between 7 and 60 nm.

According to the present invention, a specific silicon dioxide is used as support material, which comprises aggregates of essentially spherical primary particles. In the present invention, the term "essentially spherical" denotes the form of a particle that exhibits a smooth surface and whose geometrical shape approximates a sphere. However, this definition also encompasses drop-shaped primary particles or irregularly shaped primary particles with a smooth surface having a shape similar to a sphere. One characteristic of this material is the fact that its specific surface area is largely based on the geometrical surface (outer surface) of the primary particles, i.e. the material exhibits almost no pores. It is essentially non-porous.

The material to be used according to the present invention can easily be distinguished from usual, porous silicon dioxide materials by means of an electron microscope. The electron microscopic examinations clearly show the non-porous structure of the primary particles and allow the determination of their average particle diameter. These examinations can even be conducted with samples of the finished catalytic coating and allow identification of the material.

The non-porous silicon dioxide can for example be prepared by subjecting silicon tetrachloride to a so-called flame hydrolysis (see for example "Schriftenreihe Pigmente" of the company Degussa AG, Number 11, 5$^{th}$ edition, August 1991: "Grundlagen von Aerosil®" [Technical Bulletin Pigments No. 11: The basics of Aerosil®]). For this purpose, silicon tetrachloride is brought into the gas phase and subsequently reacts quantitatively with water within an oxyhydrogen flame, thus forming the desired silicon dioxide. However, such materials can also be obtained in an arc and in plasma In the following, silicon dioxide obtained from flame hydrolysis is also referred to as pyrogenic silicon dioxide.

Due to their solidification from a melt, the resulting primary particles are essentially spherical. They attach themselves to other primary particles and form what is referred to as aggregates, which generally cannot be broken up again into individual primary particles.

The size of the primary particles can be adjusted to about 7 to 60 nm by modifying the process parameters of the flame hydrolysis. In the catalyst according to the present invention, it is preferred that a material be used that has an average primary particle size of more than 15 nm and a specific surface area of up to about 150 m$^2$/g. It is particularly preferred that the support material has an average primary particle size of between 20 and 50 nm and a specific surface area of between 90 and 40 m$^2$/g.

The pyrogenic silicon dioxide is essentially non-porous and preferably has a pore volume of less than 0.2 ml/g of pore diameters less than 30 nm. Its maximum of the pore radius diameter is usually above 20 nm. The material is preferably acidic, i.e. its pH value in a 4 weight-% dispersion is less than 6, more preferably less than 5.5.

In order to increase its thermal stability, the support material can be doped with one or more oxides selected from the group consisting of aluminum oxide, zirconium oxide, alkaline-earth metal oxides and rare earth oxides. The weight of all doping elements should lie between 0.01 and 20 wt.-%, based on the total weight of the support material. The doping of the silicon dioxide is preferably carried out with the help of an aerosol, as described in EP-A-995 718. According to this application, doping is carried out by introducing an aerosol into a flame as used for the pyrogenic preparation of silica by means of flame oxidation or flame hydrolysis, the aerosol containing salts or salt mixtures of the doping element or the element itself in dissolved or suspended form or mixtures thereof. After the reaction in the flame, the doped silicon dioxide is separated from the gas flow. Preferably, a support material is used that is doped with aluminum oxide in an amount of between 0.05 und 1 wt.-%.

Since the silicon dioxide to be used in the catalytically active coating according to the present invention has a low porosity, adsorption of the hydrocarbons, which is responsible for the primary poisoning ("the clogging of pores"), is largely suppressed. Thus, secondary aging effects due to the burn-up of accumulated hydrocarbons and the ensuing thermal damage to the catalyst are avoided. It is also advantageous that in a preferred embodiment the support material is acidic. Thus, the incorporation of the sulfur dioxide contained in the exhaust gas into the support material in the form of sulfates is made more difficult The incorporation of the sulfur components contained in the exhaust gas of combustion engines in catalysts is based on an acid-base reaction and is especially observed in the case of basic support materials.

Thus, the catalyst according to the present invention preferably exhibits the following combination of features:

It comprises a catalytically active coating on an inert ceramic or metal honeycomb body, said coating comprising at least one platinum group metal selected from the group consisting of platinum, palladium, rhodium and iridium on a fine, oxidic support material. The oxidic support material is a fine silicon dioxide preferably having one or more of (more preferably all of) the following properties:

a) it is comprised of aggregates of essentially spherical primary particles having an average particle diameter of between 15 and 60 nm, b) the specific surface is between 30 and 150 m$^2$/g, c) the maximum of the pore radius distribution is above 20 nm, d) the total volume of pores having a pore diameter of less than 30 nm is less than 0.2 ml/g, and e) the pH value of a 4 weight-% aqueous dispersion of the support material is less than 6.

Preferably, platinum is used as catalytically active component in the catalyst according to the present invention, which is applied in a highly dispersed form onto the support material by means of known methods.

The catalyst according to the present invention can additionally comprise zeolites in the catalytically active coating to reduce the emission of hydrocarbons at low exhaust gas temperatures. The zeolites can also be coated with platinum to allow a continuous combustion of the adsorbed hydrocarbons. Thus, the zeolites also contribute to the reduction of the accumulation of hydrocarbons on the catalyst. Preferred zeolites include a dealuminated Y-zeolite, a beta-zeolite and a ZSM-5 zeolite, each with a modulus of more than 40. The modulus of a zeolite denotes its molar ratio of silicon dioxide to aluminum oxide. The higher the modulus, the lower the zeolite's aluminum oxide content. As a rule, the temperature stability and the stability of a zeolite against an acid attack increase as its modulus increases.

The mentioned zeolites can be used alone, in combination with each other or in combination with other zeolites. Preferably, the weight ratio of the silicon dioxide to the zeolites contained in the catalyst is between 6:1 and 1:2. In order to ensure a continuous burn-up of the hydrocarbons adsorbed by the zeolites, it is sufficient that only a small part of the total platinum contained in the catalyst be present on the zeolites. It has been found that 1 to 20 wt.-% of the total platinum present in the catalyst is sufficient for this purpose.

The catalyst according to the present invention comprises an inert honeycomb body onto which the catalytically active coating has been deposited Honeycomb bodies suitable for the catalyst include ceramic bodies (for example made from cordierite) or metal bodies, as are used on a large scale for the purification of exhaust gases from vehicles. They usually have a cylindrical shape, and flow ducts for the exhaust gases to be purified run through the length of the cylinder from one end to another. The density of the flow ducts throughout the cross-section of the honeycomb bodies is referred to as cell density. It is typically between 40 and 250 cm$^{-2}$. The catalytically active coating is generally provided on the walls of the flow ducts and is therefore in contact with the exhaust gas flowing by.

The loading of the catalytically active coating is important for the catalytic activity of the catalyst. The loading is expressed as a concentration, i.e. as weight per external volume of the honeycomb body (g/l). This concentration is preferably between 40 and 300 g/l honeycomb body volume for the entire catalytically active coating and between 0.01 und 8 g/l honeycomb body volume for the platinum group metals.

For the preparation of the catalyst, preferably a slurry or coating suspension of the fine powder materials of the future catalytically active coating is prepared and the honeycomb body is coated therewith. The processes for coating honeycomb bodies with the catalytically active coating are well known to the person skilled in the art The slurry of the powder materials is preferably prepared with water.

The application of the platinum group metals onto the support materials (silicon dioxide, zeolites and optionally further components) can be carried out at different times during the production process. Preferably, the platinum group metals are applied onto the support materials prior to the preparation of the coating suspension. This allows a selective application of the platinum group metals in different concentrations on the various support materials. For instance, a higher concentration of platinum group metal can be applied on the silicon dioxide than on the zeolite(s).

For the application of the platinum group metals on the powdery support material those processes are preferably used that lead to a high degree of dispersion of the platinum group metals on the surfaces of the support materials and to particle sizes of the metal crystallites of between 1 and 50 nm, preferably between 2 and 20 nm. Especially suitable processes are the pore volume impregnation and homogeneous precipitation.

During pore volume impregnation of a given amount of support material, precursors of the platinum group metals are dissolved in an amount of water the volume of which corresponds to 70 to 110% of the water absorption capacity of the support material determined beforehand. It is advantageous to agitate the support material e.g. in a coating pan while it is being sprayed with the platinum group metal solution. After completion of the pore volume impregnation, the impregnated support material forms a powder, which, despite its water content, is still flowable.

Homogeneous precipitation is described for example in U.S. Pat. No. 6,103,660. In this process, the support material is suspended in water together with a precursor compound of the platinum group metals. An injection of a basic or acidic solution into the suspension by means of a capillary (capillary injection) causes the precursor compound to precipitate on the surface of the support material. In order to guarantee a uniform precipitation throughout the entire suspension, the basic or acidic solution is added slowly and distributed uniformly throughout the suspension by string.

Precursor compounds of the platinum group metals include all soluble compounds that can be converted into the catalytically active components during calcination in air. Examples of such compounds include hexachloroplatinic acid, tetrachloroplatinic acid, diaminedinitroplatinum-(II), tetraamine-platinum-(II)-chloride, ammoniumtetrachloroplatinate-(I), ammoniumhexachloroplatinate-(IV), platinumethylenediaminedichloride, tetraamieplatinum-(II)-nitrate, tetraamie-platinum-(II)-hydroxide, methylethanolamine-platinum-(II)-hydroxide, ethanolamnieplatinum-(II)-hexahydroxide, platinum nitrate, palladium chloride, palladium nitrate, diaminedinitropalladium-(II), tetraaminepalladium-(II)-hydroxide, rhodium chloride, rhodium nitrate and hexachloroiridium acid.

After impregnation and prior to further processing, the catalytically active components can be fixated on the support material by means of calcination in air at temperatures between 200 and 600° C. This causes the precursor compounds of the platinum group metals to decompose into oxides of various oxidation states. Calcination can for example be carried out in a rotary kiln. Preferably, calcination is carried out by means of spray calcination. During spray calcination, the impregnated material is blown into a hot gas flow generated by burning methane and is calcined at a gas temperature of from 700 to 1000° C. and a dwell time in the gas flow of from fractions of a second to a few minutes, e.g. preferably 0.1 s to 1 min, more preferably 0.5 s to 5 s. Spray calcination of powdery substances is described in U.S. Pat. No. 6,228,292 B1. However, calcination prior to further processing of the catalyzed support materials is not always necessary.

Both the non-porous silicon dioxide to be used according to the present invention and the other oxidic support materials of the catalyst can be coated with the desired catalytically active platinum group metals in this manner, usually, the platinum group metals are applied in concentrations of between 0.01 to 10 wt.-%, based on the total weight of the support material and platinum group metals.

For coating the honeycomb body with the thus obtained catalyst materials, a, generally aqueous, suspension of these materials is prepared. Then the honeycomb body can be coated with this suspension by means of known methods; i.e. essentially, a coating is applied to the wall surfaces of the partitions between the flow ducts. The coating is then dried at elevated temperatures and optionally calcined in air at temperatures between 200 and 600° C. If necessary, the thus obtained coating can be further impregnated with additional precursor compounds of the platinum group metals or of non-noble metals.

In the preparation of the coating suspension, it is advantageous to use the pyrogenic silicon dioxide to be used according to the present invention in an agglomerated form with a compacted bulk density of more than 200 g/, preferably more than 500 g/l and even more preferably more than 600 g/l. In this agglomerated form it can be processed more easily to form a coating suspension. In contrast, the non-agglomerated pyrogenic silicon dioxide only has a compacted bulk density of less than 100 g/l and is therefore difficult to process.

The compacted bulk density is the quotient of the weight and the volume of a powder after compacting in a compacting volumometer under certain set conditions (see DIN ISO 787/XD. The terms "primary particles", "aggregates" and "agglomerates" as used in the present invention are defined in DIN 53206, Sheet 1.

The process of spray drying has proven to be especially suitable for the agglomeration of the powdery pyrogenic silicon dioxide. For this purpose, the powdery material is suspended in water with the help of known dispersion devices. Suspensions having a solids content of between 100 and 600 g/l are suitable for the subsequent spray drying process. The suspension is for example introduced into a spray dryer using a two-fluid nozzle and dried at operating temperatures between 200 and 450° C. The thus formed agglomerates have an average particle size between 15 and 30 μm.

As an alternative to the process described above, wherein the powdery support materials are first loaded with the catalytically active platinum group metals and optional promoters, i.e. are catalyzed, and then applied onto the honeycomb body in the form of a coating, it is also possible to coat the honeycomb body with the non-catalyzed support materials and then to introduce the platinum group metals and optionally the promoters into the coating by means of impregnation. It is also possible to combine the two processes. For example, a coating of pyrogenic silicon dioxide and zeolites with a weight ratio of silicon dioxide to zeolites of from 6:1 to 1:2 can be impregnated with platinum to obtain an oxidation catalyst for the purification of exhaust gases from e.g. diesel engines.

Due to the acidity and the low porosity of the support materials used in the catalyst of the present invention, it only absorbs low amounts of sulfur from the exhaust gas and thus maintains a high degree of catalytic activity even after a long operating life with exhaust gas containing sulfur dioxide. It is therefore excellently suited for the oxidative purification of exhaust gases from diesel engines. For example, after the oven aging described in Application Example 1, less than 0.25 wt.-% sulfur dioxide, based on the total weight of the catalyst consisting of honeycomb body and coating, was measured when synthetic exhaust gas with 85 vol.-ppm sulfur dioxide flowed through the catalyst. After aging in the engine for 45 hours, as described in Application Example 2, also less than 0.25 wt-% sulfur dioxide, based on the total weight of the catalyst consisting of honeycomb body and coating, was measured when diesel fuel with 2400 wt.-ppm sulfur was used. Furthermore, the specific surface area of the catalyst had decreased by less than 20% compared to the value prior to aging.

The following examples and examinations will explain the present invention in more detail. However, they are not construed as to be limiting.

EXAMPLES

Examination of Support Materials

Various metal oxides used in the following catalysts were characterized with respect to their specific surface area, their pore structure and their acidity. The acidity was determined as the pH value of an aqueous dispersion of the respective support material with 4 weight-% support material, based on the total weight of the dispersion. The results are shown in Table 1.

TABLE 1

Characterization of metal oxides with respect to their specific surface area, pore structure and pH value of an aqueous dispersion

| No. | Support material | Specific surface area [m²/g] | Maximum of the pore radius distribution [nm] | Pore volume for pores <30 nm [ml/g] | pH value of a 4 wt-% aqueous dispersion |
|---|---|---|---|---|---|
| 1 | $Al_2O_3$ | 134 | 10 | 0.47 | 8.0 |
| 2 | $Al_2O_3/SiO_2$ *) | 311 | 6.5 | 0.65 | 7.7 |
| 3 | $Al_2O_3/SiO_2$ *) | 153 | 10 | 0.50 | 7.5 |
| 4 | $SiO_2$ | 234 | 10 | 0.80 | 5.2 |
| 5 | $SiO_2$ | 159 | 10.5 | 0.75 | 5.4 |
| 6 | $SiO_2$ | 65 | 45 | 0.09 | 4.7 |

*) aluminum silicate with 5 wt. % $SiO_2$

Support material no. 6 fulfills the requirements of the catalyst according to the present invention. It is a pyrogenically prepared support material with an average primary particle size of 40 nm. Its surface area is relatively small compared to support materials no. 1 to no. 5. The low surface area is due to its low porosity, which is expressed by the pore radius distribution and the low mesopore volume. The pH value of the material in a 4 wt.-% aqueous dispersion is acidic (pH=0.7). This results in a markedly reduced incorporation of sulfur dioxide or sulfur trioxide, which are also acidic. Thus, a catalyst on the basis of this support material is resistant to exhaust gas containing sulfur dioxide.

In each of the following Examples and Comparative Examples, two different open-cell honeycomb bodies (Honeycomb Body Type 1 and Honeycomb Body Type 2) were coated with a catalytic coatings. The characteristics of these honeycomb bodies are listed in Table 2.

TABLE 2

Characteristics of the employed honeycomb bodies

| Type | Material | Diameter [cm] | Length [cm] | Cell density [cm$^{-2}$] | Wall thickness [mm] |
|---|---|---|---|---|---|
| 1 | Cordierite | 11.83 | 7.6 | 62 | 0.2 |
| 2 | Cordierite | 11.83 | 15.24 | 62 | 0.16 |

Comparative Example 1

Two catalysts were prepared from a mixture of two powders catalyzed with platinum.

For the preparation of Powder 1, 1 kg of support material no. 3 (aluminum silicate) was provided in a coating pan. The aluminum silicate had a water absorption-capacity of 800 ml/kg. The aluminum silicate was continuously agitated while it was sprayed with 766 ml of an aqueous solution of ethanolamineplatinum-(IV)-hexahydroxide $((EA)_2Pt(OH)_6$=$(HO-C_2H_4-NH_3)_2+Pt^{IV}(OH)_6)$ at a volumetric flow rate of 56 ml/kg·min). The moist powder, still flowable, was calcined by blowing it into a hot gas flow generated by burning methane. The calcination was conducted at a gas temperature of 780° C. and a dwell time in the gas flow of about one second (spray calcination).

The Pt-aluminum silicate powder (Powder 1) thus prepared had a platinum content of 2.79 wt.-%. A sample of this material was examined under a transmission electron microscope. FIG. 1 shows a photograph of the structure of this catalyst material.

For the preparation of Powder 2, 1 kg of a Y-zeolite having a modulus of 60 was provided in a coating pan The zeolite had a water absorption capacity of 1350 ml/kg. The Y-zeolite was continuously agitated while it was sprayed with 242 ml of an aqueous solution of ethanolamineplatinum-(IV)-hexahydroxide at a volumetric flow rate of 56 ml/kg·min). The moist powder, still flowable, was calcined as described in connection with Powder 1.

The Pt-zeolite powder (Powder 2) had a platinum content of 0.88 wt.-%.

Six parts by weight of Powder 1 and one part by weight of Powder 2 were suspended in water and homogenized by grinding in a ball mill. The solids concentration of the finished coating suspension was 35 wt.-%. The pH value of the coating suspension was 6.5.

One Honeycomb Body Type 1 and one Honeycomb Body Type 2 were coated with 126 g dry substance per liter of honeycomb body volume by immersion into the coating suspension. The coating was air-dried at 120° C., calcined in air at 300° C. for 4 hours and finally reduced in a flow of forming gas (95 vol.-% $N_2$ and 5 vol.-% $H_2$) for 2 hours at 500° C.

The finished catalysts had a platinum content of 3.17 g per liter of catalyst volume.

Important preparation conditions for the catalyst of this and the following examples are summarized in Table 3.

Comparative Example 2

Two more comparative catalysts were prepared analogously to Comparative Example 1. In contrast to Comparative Example 1, support material no. 2 with double the specific surface area (5 wt.-% silicon dioxide, specific surface area 311 m²/g) was used in Powder 1.

Comparative Example 3

Two more comparative catalysts were prepared analogously to Comparative Example 1. In contrast to Comparative Example 1, support material no. 1 (pure aluminum oxide) with a specific surface area of 134 m²/g was used in Powder 1.

Comparative Example 4

Two more comparative catalysts were prepared analogously to Comparative Example 1. In contrast to Comparative Example 1, silicon dioxide with a specific surface area of 234 m/g (support material no. 4) was used in Powder 1.

Example 1

Two catalysts were prepared from a mixture of two powders catalyzed with platinum.

For the preparation of Powder 1, 1 kg of support material no. 6 (low-porosity silicon dioxide) with a specific surface area of 65 m²/g was provided in a coating pan. The low-porosity silicon dioxide had a water absorption capacity of 500 ml/kg. The silicon dioxide was continuously agitated while it was sprayed with 445 ml of an aqueous solution of ethanolamineplatinum-(IV)-hexahydroxide at a volumetric flow rate of 56 ml/(kg·min). The moist powder, still flowable, was calcined by blowing it into a hot gas flow generated by burning methane. The calcination was conducted at a gas temperature of 780° C. and a dwell time in the gas flow of about one second (spray calcination).

The Pt-silicon dioxide powder (Powder 1) thus prepared had a platinum content of 2.79 wt.-%. A sample of this material was examined under a transmission electron microscope. FIG. 2 shows a photograph of the structure of this catalyst material. The essentially spherical structure of the pyrogenic support material can be seen clearly. The spheres are compact free of pores and have a smooth surface on which the platinum particles are located (black spots). This structure is maintained even if the material is processed further and can still be detected in the finished catalyst coating It becomes immediately clear from FIG. 2 that the specific surface area of the support material is solely due to the geometrical surface of the spheres. In contrast, the support material of FIG. 1 has a highly irregular structure with a large specific surface area.

Powder 2 of Comparative Example 1 was used as the second catalyst powder.

Six parts by weight of Powder 1 and one part by weight of Powder 2 were suspended in water and homogenized by grinding in a ball mill. The solids concentration of the finished coating suspension was 35 wt.-%. The pH value of the coating suspension was 5.1.

Analogous to Comparative Example 1, two monolithic honeycomb bodies were prepared by coating with 126 g dry substance per liter of honeycomb body volume.

The coating was air-dried at 120° C., calcined in air at 300° C. for 4 hours and finally reduced in a flow of forming gas for 2 hours at 500° C.

The finished catalysts had a platinum content of 3.17 g per liter of catalyst volume.

Example 2

Two catalysts were prepared from a mixture of two powders catalyzed with platinum.

Powder 1 of Example 1 was used as the first catalyst powder.

For the preparation of Powder 2, 1 kg of a mixture consisting of 500 g of a Y-zeolite with a modulus of 60 and 500 g of a ZSM-5 zeolite with a modulus>400 was provided in a coating pan. The zeolite mixture had a water absorption capacity of 1180 ml/kg. The zeolite mixture was continuously agitated while it was sprayed with 320 ml of an aqueous solution of ethanolamineplatinum-(IV)-hexahydroxide at a volumetric flow rate of 56 ml/(kg·min). The moist powder, still flowable, was not calcined, but used directly in the preparation of the coating suspension.

The Pt-zeolite powder (Powder 2) had a platinum content of 0.50 wt.-%.

2.2 parts by weight of Powder 1 and one part by weight of Powder 2 were suspended in water and homogenized by grinding in a bail mill. The solids concentration of the finished coating suspension was 35 wt-%. The pH value of the coating suspension was 4.9.

Analogous to Comparative Example 1, two monolithic honeycomb bodies (type 1 and type 2) were prepared by coating with 97 g dry substance per liter of honeycomb body volume.

The coating was air-dried at 120° C., calcined in air at 300° C. for 4 hours and finally reduced in a flow of forming gas for 2 hours at 500° C.

The finished catalysts had a platinum content of 3.17 g per liter of catalyst volume.

Example 3

Two more catalysts were prepared analogously to Example 2. In contrast to Example 2, Powder 1 was not spray-calcined but; like Powder 2, was in a moist state when it was further processed to form the coating suspension.

Example 4

Two more catalysts were prepared analogously to Example 2. In contrast to Example 2, Powder 1 had a platinum concentration of 2.52 wt.-%.

For the coating dispersion, 1.2 parts by weight of Powder 1 and one part by weight of Powder 2 were used. Analogous to Comparative Example 1, three monolithic honeycomb bodies were prepared by coating with 66 g dry substance per liter of honeycomb body volume.

The finished catalysts had a platinum content of 1.06 g per liter of catalyst volume.

Example 5

Two more catalysts were prepared analogously to Example 2. In contrast to Example 2, tetraamineplatinum-(II)-nitrate [Pt(NH$_3$)$_4$](NO$_3$)$_2$ was used as platinum precursor for Powder 1 and Powder 2.

Example 6

Two more catalysts were prepared analogously to Example 2. In contrast to Example 2, tetraamineplatinum(II)-hydroxide [Pt(NH$_3$)$_4$](OH)$_2$ was used as platinum precursor for Powder 1 and Powder 2.

TABLE 5

List of the measuring devices used for measuring the exhaust gas concentration in the model gas test unit

| Analyzed gas | Measuring device | Manufacturer |
|---|---|---|
| O$_2$ | Oxymat | Siemens AG |
| hydrocarbon | FID | Pierburg Meβtechnik |
| NO$_x$ | CLD 700 Elht | Zeliweger ECO-Systeme |
| CO | Binos | Rosemount |
| CO$_2$ | Binos | Rosemount |
| SO$_2$ | Binos | Rosemount |

TABLE 3

Composition and preparation conditions of the examined catalysts

| Example | Support oxide | Zeolite | Platinum salt | Concentration [g/l] | Weight ratio Pt-support oxide/Pt-zeolite | Platinum loading [g/l] | Calcination of the Pt-support oxide powder |
|---|---|---|---|---|---|---|---|
| CE1 | No. 3 | Y-Zeolite, modulus 60 | (EA)$_2$Pt(OH)$_6$ | 126 | 6:1 | 3.17 | Spray calcination |
| CE2 | No. 2 | Y-Zeolite, modulus 60 | (EA)$_2$Pt(OH)$_6$ | 126 | 6:1 | 3.17 | Spray calcination |
| CE3 | No. 1 | Y-Zeolite, modulus 60 | (EA)$_2$Pt(OH)$_6$ | 126 | 6:1 | 3.17 | Spray ealoination |
| CE4 | No. 4 | Y-Zeolite, modulus 60 | (EA)$_2$Pt(OH)$_6$ | 126 | 6:1 | 3.17 | Spray calcination |
| E1 | No. 6 | Y-Zeolite, modulus 60 | (EA)$_2$Pt(OH)$_6$ | 126 | 6:1 | 3.17 | Spray calcination |
| E2 | No. 6 | Y-Zeolite, modulus 60 ZSM-5, modulus >400 | (EA)$_2$Pt(OH)$_6$ | 97 | 2.2:1 | 3.17 | Spray calcination |
| E3 | No. 6 | Y-Zeolite, modulus 60 ZSM-5, modulus >400 | (EA)$_2$Pt(OH)$_6$ | 97 | 2.2:1 | 3.17 | none |
| E4 | No. 6 | Y-Zeolite, modulus 60 ZSM-5, modulus >400 | (EA)$_2$Pt(OH)$_6$ | 66 | 1.2:1 | 1.06 | Spray calcination |
| E5 | No. 6 | Y-Zeolite, modulus 60 ZSM-5, modutus >400 | [Pt(NH$_3$)$_4$](NO$_3$)$_2$ | 97 | 2.2:1 |  | Spray calcination |
| E6 | No. 6 | Y-Zeolite, modulus 60 ZSM-5, modulus >400 | [Pt(NH$_3$)$_4$](OH$_3$)$_2$ | 97 | 2.2:1 | 3.17 | Spray calcination |

Application Example 1

The catalytic activity of the exhaust gas purification catalysts of the above examples was measured with a model gas test unit This unit can simulate all the gaseous exhaust gas components of the actual exhaust gas from a diesel engine. The test conditions and model gas composition can be inferred from Table 4. Propene was used as hydrocarbon component.

TABLE 4

Test conditions and model gas composition for the determination of the conversion rates of the pollutants CO, HC, NO$_x$ and SO$_2$ in the model gas test unit

| Component | Concentration | |
|---|---|---|
| CO | 350 | [vppm] |
| H$_2$ | 117 | [vppm] |
| C$_3$H$_6$ | 90 | [ppmC$_3$] |
| SO$_2$ | 20 | [vppm] |
| NO | 270 | [vppm] |
| O$_2$ | 6 | [vol. %] |
| H$_2$O | 10 | [vol. %] |
| CO$_2$ | 10.7 | [vol. %] |
| N$_2$ | balance | |
| amount of gas | 1950 | [N1/h]* |
| size of catalyst | Ø 25 mm × 76 mm | |
| space velocity | 50000 | [h$^{-1}$] |
| heating rate | 15 | [° C./min] |

*1/h under normed conditions (pressure: 101.3 kPa, temperature: ° C.).

For measuring the gas components present in the exhaust gas, the measuring devices listed in Table 5 were used.

The measurements were-carried out both with fresh and aged catalysts (oven aging: 48 hours at 350° C. in the model exhaust gas flow: space velocity 15,000 h$^{-1}$, 10 vol.-% H$_2$O, 10 Vol.-% O$_2$, 10 vol.-% CO$_2$, 85 vol.-ppm SO$_2$, 270 vol.-ppm NO, balance N$_2$).

The exhaust gas was heated at a rate of 15° C./min in order to determine the light-off temperatures.

The following formula was used for the calculation of the conversion rates:

$$X = \frac{N_E - N_A}{N_E} \cdot 100\%$$

X=conversion rate [%]

NE=concentration of the pollutant before entering the catalyst [vol.-ppm]

NA=concentration of the pollutant after exiting the catalyst [vol.-ppm]

The measuring results for both the fresh and the aged catalysts are shown in Table 6. Table 6 also lists the sulfur concentration of the aged catalysts, determined by post-mortem analysis using a combined combustion/IR spectrometric method (LECO Instruments).

Table 6 clearly shows that the catalysts of the present invention prepared in Examples E1 to E6 exhibit an excellent sulfur-resistance, contrary to the comparative catalysts from Comparative Examples CE1 to CE4. This becomes obvious from the very low sulfur uptake by the catalysts of the present invention on the one hand and the still excellent catalytic activity after aging on the other hand.

TABLE 6

Catalytic activity of the catalysts from the examples in a fresh state and after oven aging, as well as sulfur uptake of the aged catalysts

| | Fresh | | Aged[1] | | |
|---|---|---|---|---|---|
| Catalyst | $T_{50,CO}$ [° C.][2] | $T_{50,HC}$ [° C.] | $T_{50,CO}$ [° C.] | $T_{50,HC}$ [° C.] | S-Conc. [%][3] |
| CE1 | 144 | 158 | 161 | 174 | 0.90 |
| CE2 | 155 | 169 | 185 | 201 | 1.50 |
| CE3 | 149 | 166 | 169 | 189 | 1:20 |
| CE4 | 152 | 165 | 170 | 182 | 0.61 |
| E1 | 145 | 155 | 146 | 155 | 0.10 |
| E2 | 141 | 152 | 141 | 153 | 0.10 |
| E3 | 144 | 155 | 144 | 157 | 0.10 |
| E4 | 185 | 193 | 186 | 193 | 0.08 |
| E5 | 153 | 162 | 155 | 164 | 0.10 |
| E6 | 151 | 158 | 153 | 159 | 0.11 |

[1]Oven aging for 48 hours at 350° C. in the model exhaust gas flow: space velocity 15,000 h$^{-1}$, 10 vol. % H$_2$O, 10 vol. % O$_2$, 10 vol. % CO$_2$, 85 vol.-ppm SO$_2$, 270 vol.-ppm NO, balance N$_2$
[2]catalytic activity of the catalysts characterized by the so-called light-off temperature, at which 50% of the pollutants are converted
[3]determination of the sulfur concentration of the aged catalysts by post-mortem analysis using a combined combustion/IR spectrometric method (LECO Instruments).

Application Example 2

In a second Application Example, the catalytic activity of the exhaust gas purification catalysts of the above exemplary catalysts was measured both in a fresh and in an aged state in an actual diesel engine exhaust gas. Aging was carried out by repeatedly passing through the aging cycle depicted in FIG. 1. Aging was carried out in a modern automobile diesel engine with a displacement volume of 1.9 L. For this aging process, a diesel fuel containing 2400 wt.-ppm sulfur, which is 10 times more than in conventional diesel fuels, was used. This ensured that the catalysts would age much faster. The evaluation of the catalytic activity and the physicochemical data of the examined catalysts correspond to the actual aging of a catalyst after about 30,000 kilometers. This aging is representative of a catalyst aged during driving in actual traffic.

The catalytic activity was determined with the engine by a so-called light-off test. For this purpose, the catalyst was first conditioned with diesel exhaust gas for 5 minutes at an exhaust gas temperature of 100° C. Then a stepwise test was carried out wherein every 20 minutes the exhaust gas temperature was increased by 10° C. The increase in the exhaust gas temperature was achieved by increasing the load on the engine.

The light-off temperatures of the examined catalysts in the fresh and the aged states are listed in Table 7 by giving the $T_{50}$-temperatures for CO and HC.

Table 7 also contains additional physicochemical post-mortem data of the aged catalysts. The sulfur concentration was determined using the LECO method, and the specific surface areas were determined using the BET method according to DIN 661311.

Table 7 shows that engine aging hardly decreases the catalytic activity of the catalysts of the present invention prepared in Examples E1 to E6, whereas the comparative catalysts of Comparative Examples CE1 to CE4 show a considerable decrease in catalytic activity. The physicochemical analyses show that the deterioration is due to the decrease in the specific surface area caused by a "clogging of the pores", adsorbed hydrocarbons and the incorporation of large amounts of the catalyst poison sulfur. Due to the chemistry and morphology of the employed support materials, the catalysts of the present invention prepared in Examples E1 to E6 do not exhibit these effects.

TABLE 7

Catalytic activity and physicochemical characterization of the catalysts of the examples in a fresh state and after engine aging (45 hours with diesel fuel containing 2400 wt. ppm sulfur)

| | Fresh | | | Aged | | | |
|---|---|---|---|---|---|---|---|
| Catalyst | $T_{50,CO}$ [° C.][1] | $T_{50,HC}$ [° C.] | BET [m$^2$/g][2] | $T_{50,CO}$ [° C.] | $T_{50,HC}$ [° C.] | BET [m$^2$/g] | S-Conc. [%][3] |
| CE1 | 110 | 168 | 33 | 154 | 193 | 23 | 0.98 |
| CE2 | 125 | 173 | 51 | 175 | 208 | 18 | 1.47 |
| CE3 | 115 | 176 | 31 | 165 | 201 | 22 | 1.37 |
| CE4 | 123 | 171 | 45 | 166 | 197 | 33 | 0.71 |
| E1 | 114 | 173 | 36 | 115 | 176 | 36 | 0.10 |
| E2 | 110 | 170 | 36 | 110 | 175 | 36 | 0.10 |
| E3 | 112 | 170 | 35 | 113 | 172 | 35 | 0.09 |
| E4 | 135 | 191 | 29 | 137 | 194 | 29 | 0.07 |
| E5 | 121 | 182 | 35 | 123 | 185 | 35 | 0.09 |
| E6 | 120 | 179 | 35 | 122 | 182 | 36 | 0.10 |

[1]catalytic activity of the catalysts characterized by the so-called light-off temperature, at which 50% of the pollutants are converted
[2]determination of the specific surface area of the catalysts using the BET method
[3]determination of the sulfur concentration of the aged catalysts by post-mortem analysis using a combined combustion/IR spectrometric method (LECO Instruments).

The invention claimed is:

1. A catalyst for the purification of exhaust gases from an internal combustion engine, said catalyst comprising a catalytically active coating on an inert ceramic or metal honeycomb body, said coating comprising at least one platinum group metal selected from the group consisting of platinum, palladium, rhodium and iridium supported on a fine, oxidic support material, wherein the oxidic support material: (i) is a low-porosity material containing silicon dioxide and comprises aggregates of essentially spherical primary particles having an average particle diameter of between 7 and 60 nm and (ii) has a pore volume, wherein a portion of the pore volume having pore diameters of less than 30 nm is less than 0.2 ml/g.

2. The catalyst according to claim 1, wherein the oxidic support material has an average particle diameter of the primary particles of between 20 and 50 nm.

3. The catalyst according to claim 2, wherein the oxidic support material has a pore radius distribution with a maximum above 20 nm.

4. The catalyst according to claim 3, wherein the pH value of a 4 weight-% aqueous dispersion of the support material is less than 6.

5. The catalyst according to claim 1, wherein the support material is doped with one or more oxides selected from the group consisting of aluminum oxide, zirconium oxide, alkaline-earth metal oxides and rare earth oxides and wherein the total weight of all doping elements is between 0.01 and 20 wt.-%, based on the total weight of the support material.

6. The catalyst according to claim 5, wherein the support material is doped with aluminum oxide in an amount of between 0.05 and 1 wt.-%.

7. The catalyst according to claim 1, wherein the oxidic support material is a silicic acid pyrogenically prepared by means of flame oxidation or flame hydrolysis.

8. The catalyst according to claim 1, wherein one of the platinum group metals is platinum.

9. The catalyst according to claim 8, wherein the catalytically active coating further comprises one or more zeolites on which platinum is present in a highly disperse form.

10. The catalyst according to claim 9, wherein one of the one or more zeolites is a dealuminated Y-zeolite having a modulus of more than 40, a beta-zeolite having a modulus of more than 40, or a ZSM-5 zeolite having a modulus of more than 40.

11. The catalyst according to claim 9, wherein the weight ratio of the oxidic support material to the one or more zeolites is 6:1 to 1:2.

12. The catalyst according to claim 9, wherein at least 1 wt.-% but not more than a maximum of 20 wt.-% of the total amount of platinum present in the catalytically active coating is present on the one or more zeolites.

13. The catalyst according to claim 1, wherein the catalytically active coating is present on the honeycomb body in a concentration of 40 to 300 g/l honeycomb body volume.

14. The catalyst according to claim 13, wherein the platinum group metals are present in a concentration of 0.01 to 8 g/l honeycomb body volume.

15. The catalyst according to claim 1, wherein the oxidic support material has the following properties:
   a) the aggregates of essentially spherical primary particles have an average particle diameter of between 15 and 60 mm,
   b) the specific surface area is between 30 and 150 m$^2$/g,
   c) the maximum of the pore radius distribution is above 20 nm,
   d) the total volume of pores having a pore diameter of less than 30 nm is less than 0.2 ml/g, and
   e) the pH value of a 4 weight-% aqueous dispersion of the support material is less than 6.

16. The catalyst according to claim 15, wherein the specific surface area of the silicon dioxide is less than 100 m$^2$/g.

17. The catalyst according to claim 15, wherein the catalyst additionally comprises one or more zeolites, wherein the weight ratio of silicon dioxide to the one or more zeolites is between 6:1 to 1:2.

18. The catalyst according to claim 17, wherein the platinum group metal comprises platinum, said platinum being present both on the silicon dioxide and on the one or more zeolites, wherein at least 1 wt.-% but not more than a maximum of 20 wt.-% of the total amount of platinum present in the catalyst is present on the one or more zeolites.

19. A method of purifying exhaust gas, comprising exposing said exhaust gas to the catalyst of claim 1.

20. A process for preparation of a catalyst for purification of exhaust gases from an internal combustion engine comprising a catalytically active coating on an inert ceramic or metal honeycomb body, said coating comprising at least one platinum group metal selected from the group consisting of platinum, palladium, rhodium and iridium on a fine, oxidic support material, wherein the oxidic support material: i) is a low-porosity material containing silicon dioxide and comprises aggregates of essentially spherical primary particles having an average particle diameter of between 7 and 60 nm and ii) has a pore volume, wherein a portion of the pore volume having pore diameters of less than 30 nm is less than 0.2 ml/g, the method comprising the step of coating the honeycomb body with a coating suspension containing the oxidic support material, wherein the oxidic support material is used in spray-dried form having a compacted bulk density of more than 200 g/l for the preparation of the coating suspension.

21. The process according to claim 20, wherein the compacted bulk density is more than 500 g/l.

22. The process according to claim 20, wherein at least one platinum group metal is applied to the oxidic support material before preparation of the coating suspension.

23. The process according to claim 22, wherein the coating suspension further comprises one or more zeolites in a weight ratio of the oxidic support material to the one or more zeolites of 6:1 to 1:2.

24. The process according to claim 23, wherein at least one platinum group metal comprises platinum.

25. The process according to claim 24, wherein platinum is present on the one or more zeolites in an amount of 1 to 20 wt.-%, based on the total amount of platinum on the oxidic support material and the one or more zeolites.

26. The process according to claim 20, wherein after coating the honeycomb body with the coating suspension containing the oxidic support material, the coated honeycomb body is dried and calcined and subsequently the thus prepared coated honeycomb body is impregnated with a precursor of at least one platinum group metal.

27. The process according to claim 26, wherein at least one platinum group metal comprises platinum.

28. The process according to claim 27, wherein the coating suspension additionally comprises one or more zeolites in a weight ratio of the oxidic support material to the one or more zeolites of 6:1 to 1:2.

* * * * *

UNITED STATES PATENT AND TRADEMARK OFFICE
CERTIFICATE OF CORRECTION

PATENT NO.      : 7,563,744 B2
APPLICATION NO. : 10/486148
DATED           : July 21, 2009
INVENTOR(S)     : Klein et al.

It is certified that error appears in the above-identified patent and that said Letters Patent is hereby corrected as shown below:

In the columns

Col 5, line 59, now reads: "by string"
        should read -- by stirring --

Col 5, line 64, now reads: "diaminedinitroplatinum"
        should read -- diamminedinitroplatinum --

Col 5, line 64/65, now reads: "tetraamineplatinum"
        should read -- tetraammineplatinum --

Col 5, line 66/67, now reads: "platinumethylenediaminedichloride"
        should read -- platinummethylenediaminedichloride --

Col 5, line 67, now reads: "tetraamieplatinum"
        should read -- Tetraammineplatinum --

Col 5, line 67 to Col 6, line 1, now reads: "tetraamieplatinum"
        should read -- tetraammineplatinum --

Col 6, line 4, now reads: "diaminedinitropalladium"
        should read -- Diamminedinitropalladium --

Col 6, line 4, now reads: "tetraaminepalladium"
        should read -- tetraamminepalladium --

Col. 6, line 46, now reads: "200 g/,"
        should read -- 200 g/l, --

Col 8, line 6, now reads: "(pH=0.7)"
        should read -- (pH=4.7) --

Col 8, line 14, now reads: "coatings"
        should read -- coating --

Col 10, line 34, now reads: "bail mill"
        should read -- ball mill --

CERTIFICATE OF CORRECTION (continued)
U.S. Pat. No. 7,563,744 B2

Col 11, line 4, now reads: "tetraamineplatinum"
        should read -- tetraammineplatinum --

Col 11, line 11, now reads: "tetraamineplatinum"
        should read -- tetraammineplatinum --

Col 11, line 64, now reads: "temperature: °C"
        should read -- temperature: 0° C --

Col 15, line 26, now reads: "mm,"
        should read -- nm, --

Signed and Sealed this

Twenty-third Day of February, 2010

David J. Kappos
*Director of the United States Patent and Trademark Office*